US012785339B2

(12) United States Patent
Kato et al.

(10) Patent No.: US 12,785,339 B2
(45) Date of Patent: Nov. 3, 2026

(54) CONNECTOR, CONNECTOR SET, AND CONNECTOR-EQUIPPED CABLE

(71) Applicants: ACES Electronics Co., Ltd., Taoyuan (TW); ACES Japan Co., Ltd., Tachikawa (JP)

(72) Inventors: Nobukazu Kato, Tachikawa (JP); Hiroaki Hashimoto, Tokyo (JP)

(73) Assignees: ACES Electronics Co., Ltd., Taoyuan City (TW); ACES Japan Co., Ltd., Tachikawa (JP)

( * ) Notice: Subject to any disclaimer, the term of this patent is extended or adjusted under 35 U.S.C. 154(b) by 343 days.

(21) Appl. No.: 18/697,842

(22) PCT Filed: Oct. 5, 2022

(86) PCT No.: PCT/JP2022/037327
§ 371 (c)(1),
(2) Date: Apr. 2, 2024

(87) PCT Pub. No.: WO2023/058696
PCT Pub. Date: Apr. 13, 2023

(65) Prior Publication Data

US 2025/0239821 A1 Jul. 24, 2025

(30) Foreign Application Priority Data

Oct. 6, 2021 (JP) ................................ 2021-164921

(51) Int. Cl.
*H01R 24/50* (2011.01)

(52) U.S. Cl.
CPC .................................. *H01R 24/50* (2013.01)

(58) Field of Classification Search
CPC ...................................................... H01R 24/50
(Continued)

(56) References Cited

U.S. PATENT DOCUMENTS 11,444,396 B2 * 9/2022 Ji ........................ H01R 13/6581
11,721,940 B2 * 8/2023 Nakagawa ............. H01R 12/57
439/607.05

(Continued)

FOREIGN PATENT DOCUMENTS

CN 109217031 A 1/2019
JP 2019185858 A 10/2019

(Continued)

OTHER PUBLICATIONS

PCT International Search Report for International Application No. PCT/JP2022/037327, mailed Dec. 27, 2022, 5pp.

(Continued)

*Primary Examiner* — Gary F Paumen
(74) *Attorney, Agent, or Firm* — The Roy Gross Law Firm, LLC; Roy D. Gross

(57) ABSTRACT

The connector is for wire-to-board connections and, by mating with a partner connector, connects a plurality of coaxial cables used in high-frequency signal transmission and a circuit board. The connector comprises: a plurality of first contacts that are connected to the internal conductor in each of the plurality of coaxial cables, respectively; and a second contact that is connected to ground which is a reference potential. The second contact has a shielding section disposed between the plurality of first contacts. The shielding section includes two inter-connection shielding plates provided between adjacent first contact signal line connections, so as to be orthogonal to the direction in which the signal line connections face.

13 Claims, 16 Drawing Sheets

(58) Field of Classification Search
USPC .................................................... 439/63, 581
See application file for complete search history.

(56) References Cited

U.S. PATENT DOCUMENTS

| | | | | |
|---|---|---|---|---|
| 11,777,241 | B2 * | 10/2023 | Kato .................. | H01R 13/6594 439/77 |
| 2021/0242617 | A1 | 8/2021 | Ji et al. | |
| 2021/0242631 | A1 | 8/2021 | Nakagawa | |
| 2022/0320775 | A1 | 10/2022 | Kato | |

FOREIGN PATENT DOCUMENTS

| | | | |
|---|---|---|---|
| JP | 2020068163 | A | 4/2020 |
| KR | 1020100069334 | A | 6/2010 |
| WO | 2021024941 | A1 | 2/2021 |

OTHER PUBLICATIONS

PCT Written Opinion for International Application No. PCT/JP2022/037327, mailed Dec. 27, 2022, 4pp.

* cited by examiner

CONNECTOR, CONNECTOR SET, AND CONNECTOR-EQUIPPED CABLE

CROSS REFERENCE TO RELATED APPLICATIONS

This application is a National Phase of PCT Patent Application No. PCT/JP2022/037327 having International filing date of Oct. 5, 2022, which claims the benefit of priority of Japanese Patent Application No. 2021-164921, Oct. 6, 2021, the contents of which are all incorporated herein by reference in their entirety.

TECHNICAL FIELD

The present invention relates to a connector, a connector set and a connector-equipped cable, and in particular to a technique suitable for an intra-apparatus wiring of a communication device.

BACKGROUND ART

In recent years, as next-generation mobile communication-enabled apparatuses such as 5G-enabled smartphones have been practically used, connectors used for intra-apparatus wiring have been improved. For example, PTL 1 discloses as a board-to-wire connector suitable for a case where the distance between a main board of a communication device and an antenna module board is long, a connector that can collectively electrically connect, to the antenna module board, a coaxial cable for high-speed (high-frequency) signal transmission and other electric wires such as a discrete cable.

In addition, M.2 compliant expansion cards such as wireless module boards support a plurality of RF terminals for high-speed signal transmission to achieve speedup and stabilization of radio communication, and can simultaneously transmit the data by using a plurality of antennas.

CITATION LIST

Patent Literature

PTL 1
WO2021/024941

SUMMARY OF INVENTION

Technical Problem

Incidentally, it is necessary to reinforce the ground structure of the connector in order to enhance the high-speed transmission. In addition, it is necessary to ensure the isolation between the high-speed signal transmission paths, and between the high-speed signal transmission path and other signal transmission paths. In general, a ground member connected to the ground, which is the reference potential, is disposed between adjacent transmission paths for the purpose of shielding between the transmission paths. However, the structure of known ground members is flat, and as such the shielding performance is insufficient.

In addition, in the related art, when connecting a plurality of coaxial cables to an expansion card, the connector is individually mounted at the tip end of the coaxial cable, and connected one by one to the RF terminal of the expansion card. As such, the operation of connecting the coaxial cable is complicated, and it is difficult to reduce the mounting space of the RF connector at the expansion card.

An object of the present invention is to provide a connector, a connector set and a connector-equipped cable that can meet the requirement of an intra-apparatus wiring of a communication device, and in particular can achieve improvement in high-speed transmission characteristics, improvement in connectivity of a coaxial cable and size reduction of a circuit board (e.g., an M.2 compliant expansion card) as the connection target.

Solution to Problem

An electric wire-to-board connector according to the present invention is configured to connect a circuit board and a plurality of coaxial cables used for transmission of a high-frequency signal when joined to a mating connector mounted on the circuit board, the connector including: a plurality of first contacts connected to respective inner conductors of the plurality of coaxial cables; and a second contact connected to a ground that is a reference potential. The second contact includes a shielding part disposed between the plurality of first contacts. The shielding part includes two interconnection shielding plates provided orthogonal to an opposing direction of signal line connection parts of the first contacts adjacent to each other between the signal line connection parts.

A connector set according to the present invention includes: a plug connector including the above-described connector; and a receptacle connector including the mating connector.

A connector-equipped cable according to the present invention includes: the above-described connector; and the coaxial cable connected to the connector.

Advantageous Effects of Invention

With the connector, the connector set and the connector-equipped cable according to the present invention, it is possible to meet the requirement of an intra-apparatus wiring of a communication device, and in particular can achieve improvement in high-speed transmission characteristics, improvement in connectivity of a coaxial cable and size reduction of a circuit board as the connection target.

DESCRIPTION OF EMBODIMENTS

Embodiments of the present invention are elaborated below with reference to the accompanying drawings.

First Embodiment

Figure 1:
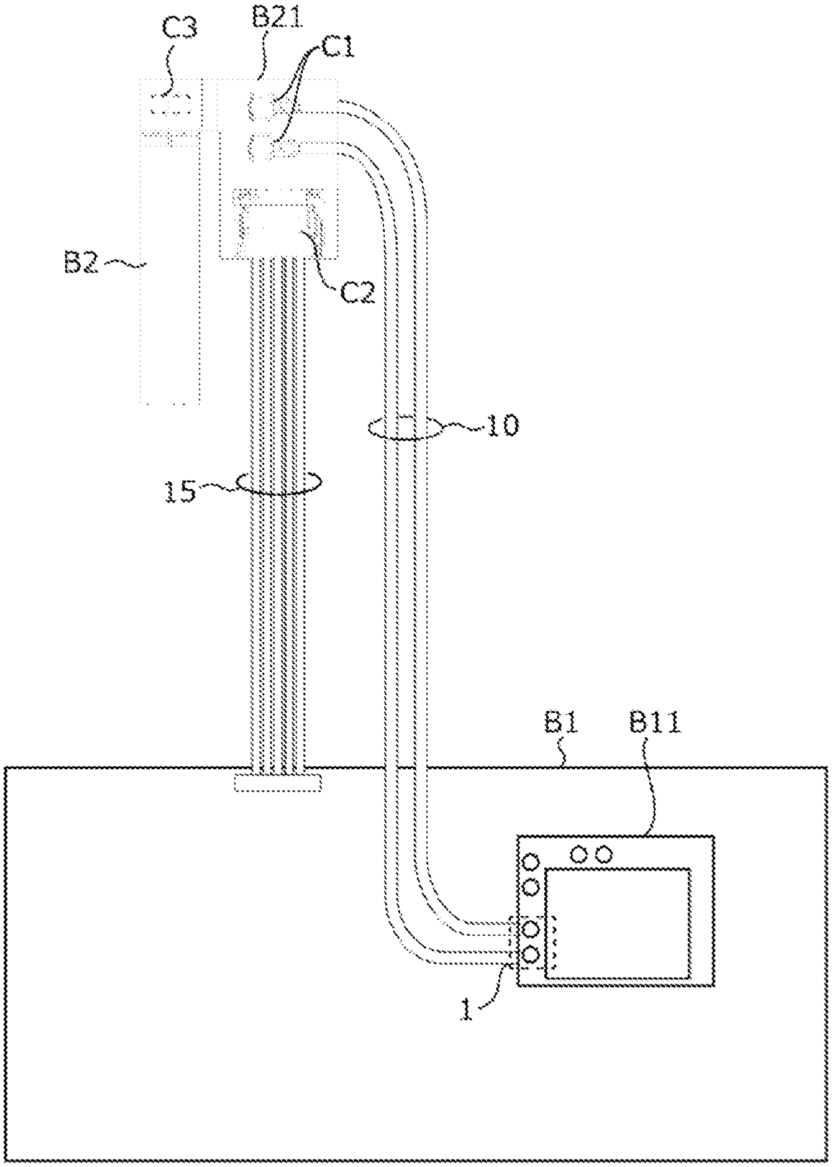
FIG. 1 is a diagram illustrating an example of a wiring structure to which a connector set of a first embodiment is applied.

FIG. 1 is a diagram illustrating an example of a wiring structure to which connector set 1 according to the first embodiment of the present invention is applied.

FIG. 1 illustrates a case where connector set 1 is applied to the connection between coaxial cable 10 and expansion card B11 mounted on main board B1 of a personal computer. Expansion card B11 conforms to the M.2 standard, and a plurality of (e.g., six) coaxial cables 10 can be connected to thereto, for example.

By applying connector set 1, the plurality of (in the present embodiment, two) coaxial cables 10 can be collectively connected to expansion card B11, and thus the connectivity is improved. In addition, the area between the RF terminals (first receptacle contact 121) of expansion card B11 can be reduced in comparison with the related art, and size reduction of the mounting space of receptacle connector 120 can be achieved, and in turn, size reduction of expansion card B11 can be achieved.

The other end of coaxial cable 10 is connected to antenna module board B2, for example. In FIG. 1, coaxial cable 10 is connected to antenna module board B2 through relaying FPC board B21 (also called interposer). More specifically, two single-core coaxial connectors C1 and one WTB connector C2 are mounted on relaying FPC board B21. Coaxial cable 10 is connected to coaxial connector C1, and a plurality of (in FIG. 1, five) discrete cables 15 are connected to WTB connector C2. The other end of discrete cable 15 is connected to main board B1 to transmit a power signal and a control signal. In addition, relaying FPC board B21 is connected to antenna module board B2 through BTB connector C3.

Note that connector set 1 may be applied for the connection of relaying FPC board B21 and coaxial with cable 10.

Figure 2A:
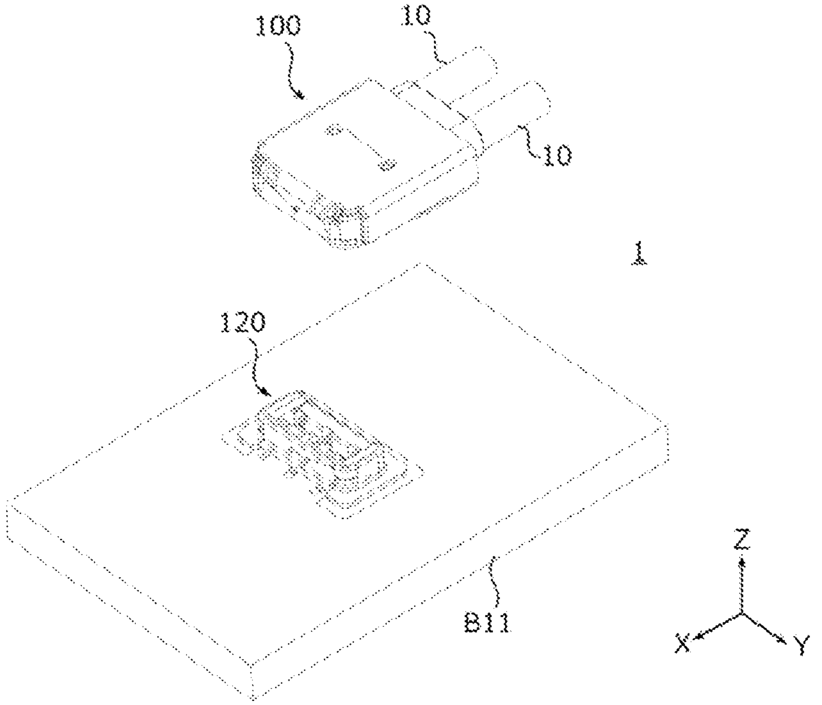
FIGS. 2A and 2B are perspective views illustrating an external appearance of the connector set according to the first embodiment.
Figure 2B:
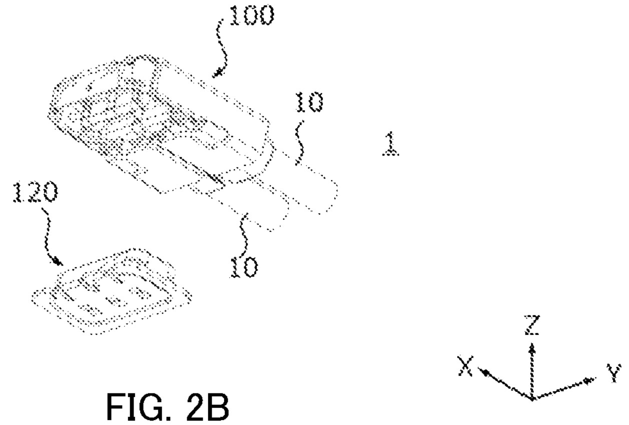

FIGS. 2A and 2B are perspective views illustrating an external appearance of connector set 1. FIGS. 2A and 2B illustrate a disassembled state of connector set 1, i.e., a state before plug connector 100 and receptacle connector 120 are joined. Note that in FIG. 2B, the illustration of expansion card B11 where receptacle connector 120 is mounted is omitted.

The present embodiment is described by using an orthogonal coordinate system (X, Y, Z). The common orthogonal coordinate system (X, Y, Z) is used also in the drawings described later. The X direction is the short direction of connector set 1, the Y direction is the longitudinal direction (pitch direction) of connector set 1, and the Z direction is the joining direction of connector set 1.

As illustrated in FIGS. 2A and 2B, connector set 1 includes plug connector 100 and receptacle connector 120. Plug connector 100 is attached to one end of coaxial cable 10, and used as a connector-equipped cable. Receptacle connector 120 is mounted on expansion card B11.

Figure 4:
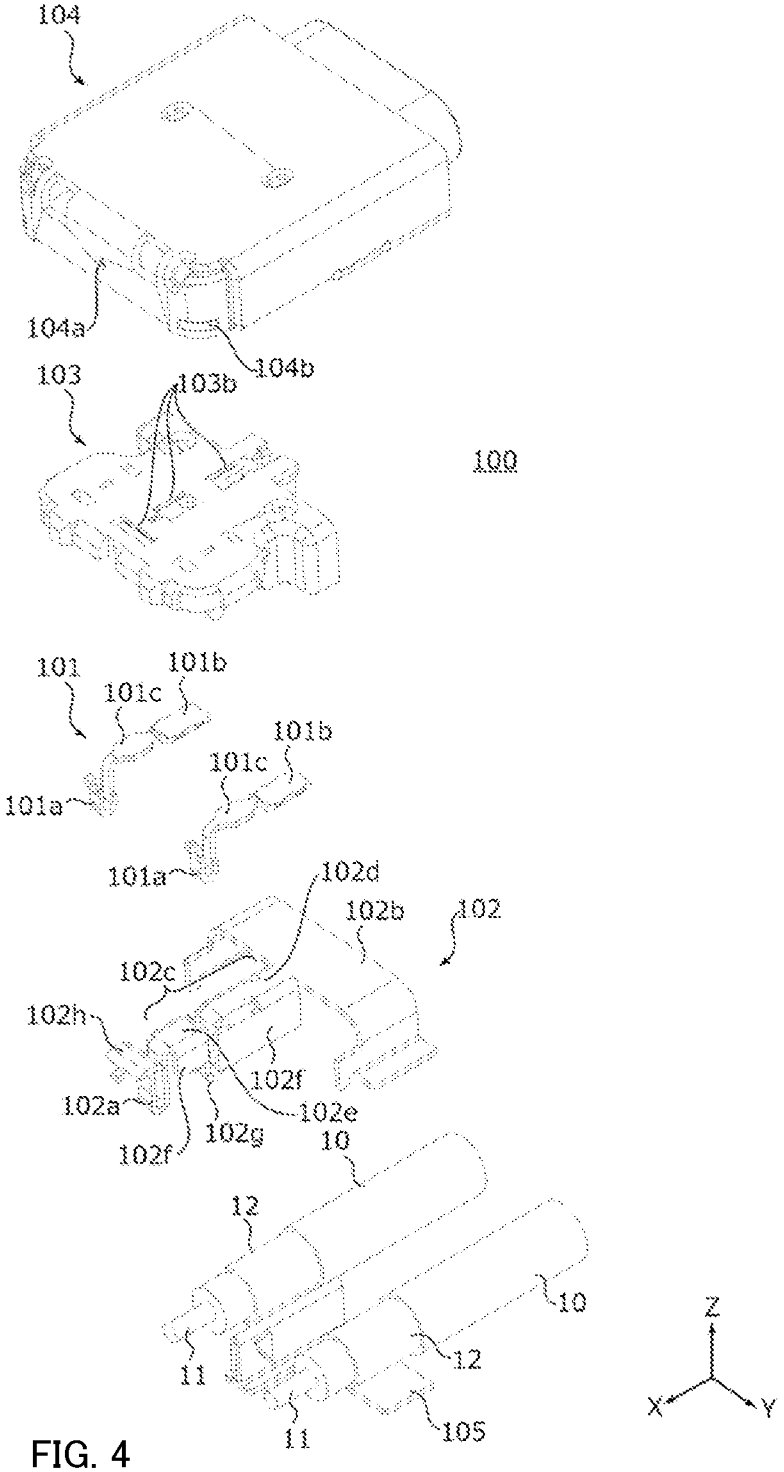
FIG. 4 is an exploded perspective view illustrating the plug connector according to the first embodiment.

Coaxial cable 10 includes inner conductor 11, and outer shield layer 12 disposed on the outside of inner conductor 11 through an insulator (whose reference numeral is omitted) (see FIG. 4). Inner conductor 11 of coaxial cable 10 is used for high-speed (high-frequency) signal transmission, for example.

Connector set 1 electrically connects coaxial cable 10 and expansion card B11 by joining plug connector 100 and receptacle connector 120. More specifically, inner conductor 11 of coaxial cable 10 is electrically connected to signal pattern P1 of expansion card B11 through first plug contact 101 of plug connector 100 and first receptacle contact 121 of receptacle connector 120 (see FIG. 7A). In addition, outer shield layer 12 of coaxial cable 10 is connected to ground pattern P2 of expansion card B11 through second plug contact 102 of plug connector 100 and second receptacle contact 122 and receptacle shell 124 of receptacle connector 120 (see FIG. 7A).

The following describes detailed configurations of plug connector 100 and receptacle connector 120.

Figure 3A:
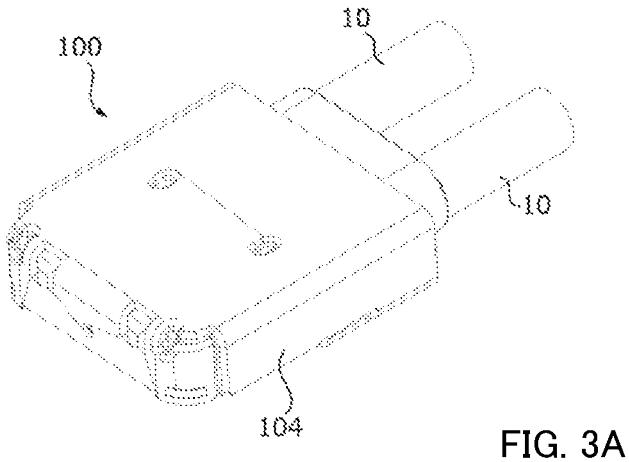
FIGS. 3A to 3C are perspective views illustrating an external appearance of a plug connector according to the first embodiment.
Figure 3B:
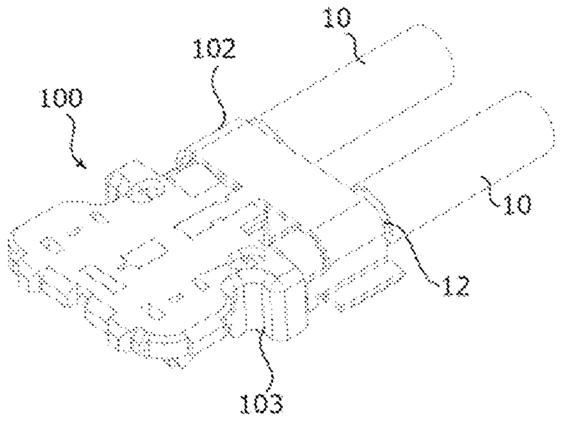
Figure 3C:
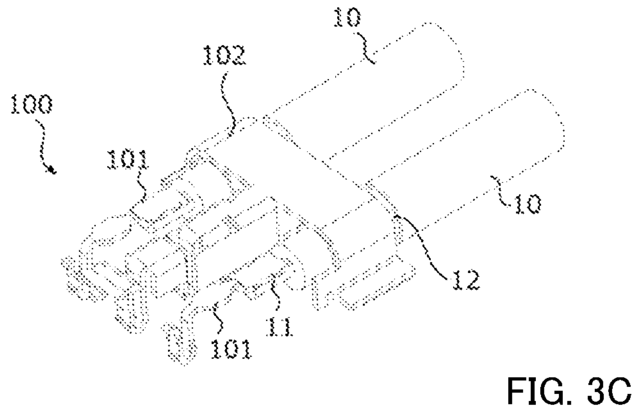
Figure 5:
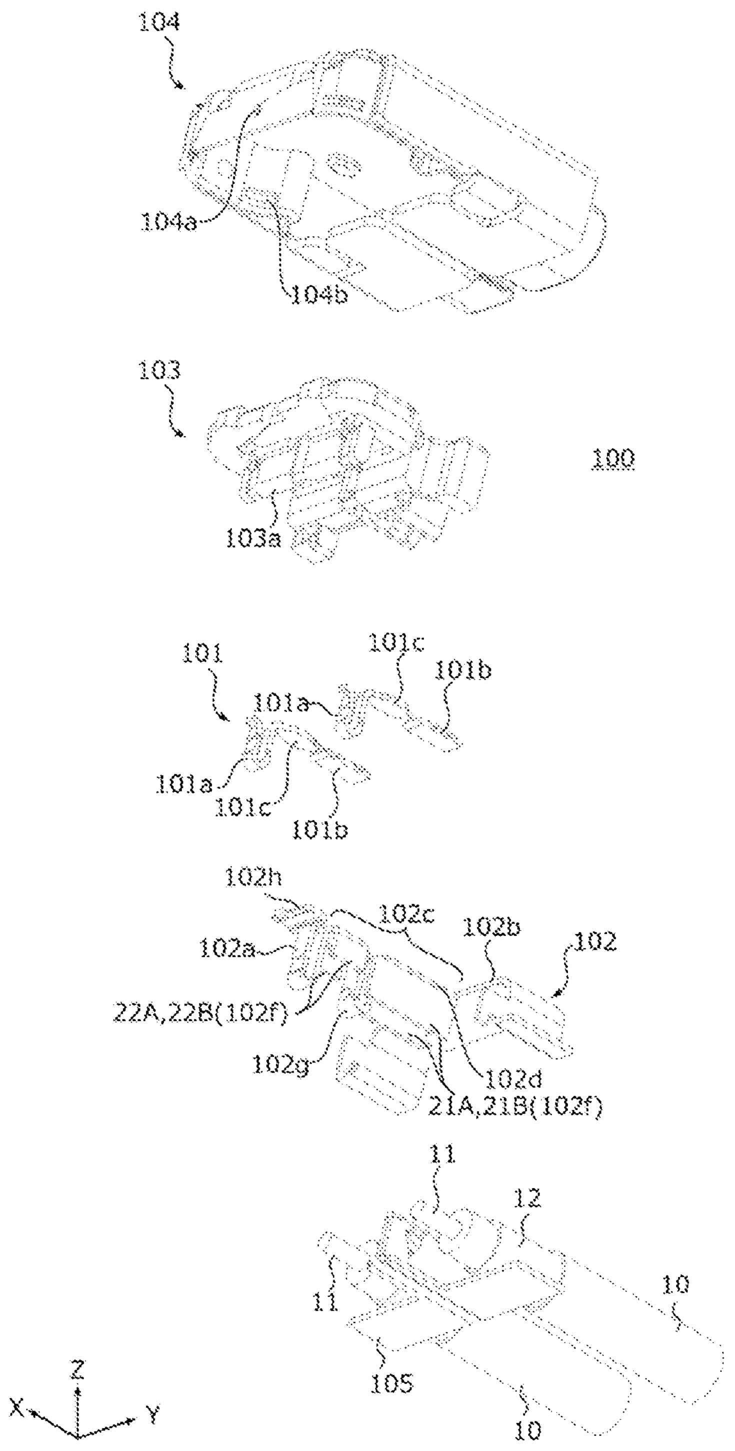
FIG. 5 is an exploded perspective view illustrating the plug connector according to the first embodiment.

FIGS. 3A to 3C are perspective views illustrating an external appearance of plug connector 100. Cover shell 104 is omitted in FIG. 3B, and plug insulator 103 and cover shell 104 are omitted in FIG. 3C. FIG. 4 is an exploded perspective view illustrating plug connector 100 as viewed from the + side in the Z direction, and FIG. 5 is an exploded perspective view illustrating plug connector 100 as viewed from the opposite side, i.e., the − side in the Z direction.

As illustrated in FIGS. 3A to 3C, 4 and 5, plug connector 100 includes first plug contact 101, second plug contact 102, plug insulator 103, cover shell 104 and the like.

First plug contact 101 and second plug contact 102 are formed of a conductive material such as metal (e.g., copper alloy). Plug insulator 103 is formed of an insulating material such as a synthetic resin (e.g., liquid crystal polymer).

Two first plug contacts 101 have the same configuration, and each of which includes signal line contact point part 101$a$, signal line connection part 101$b$ and signal line relaying part 101$c$.

Figure 6:
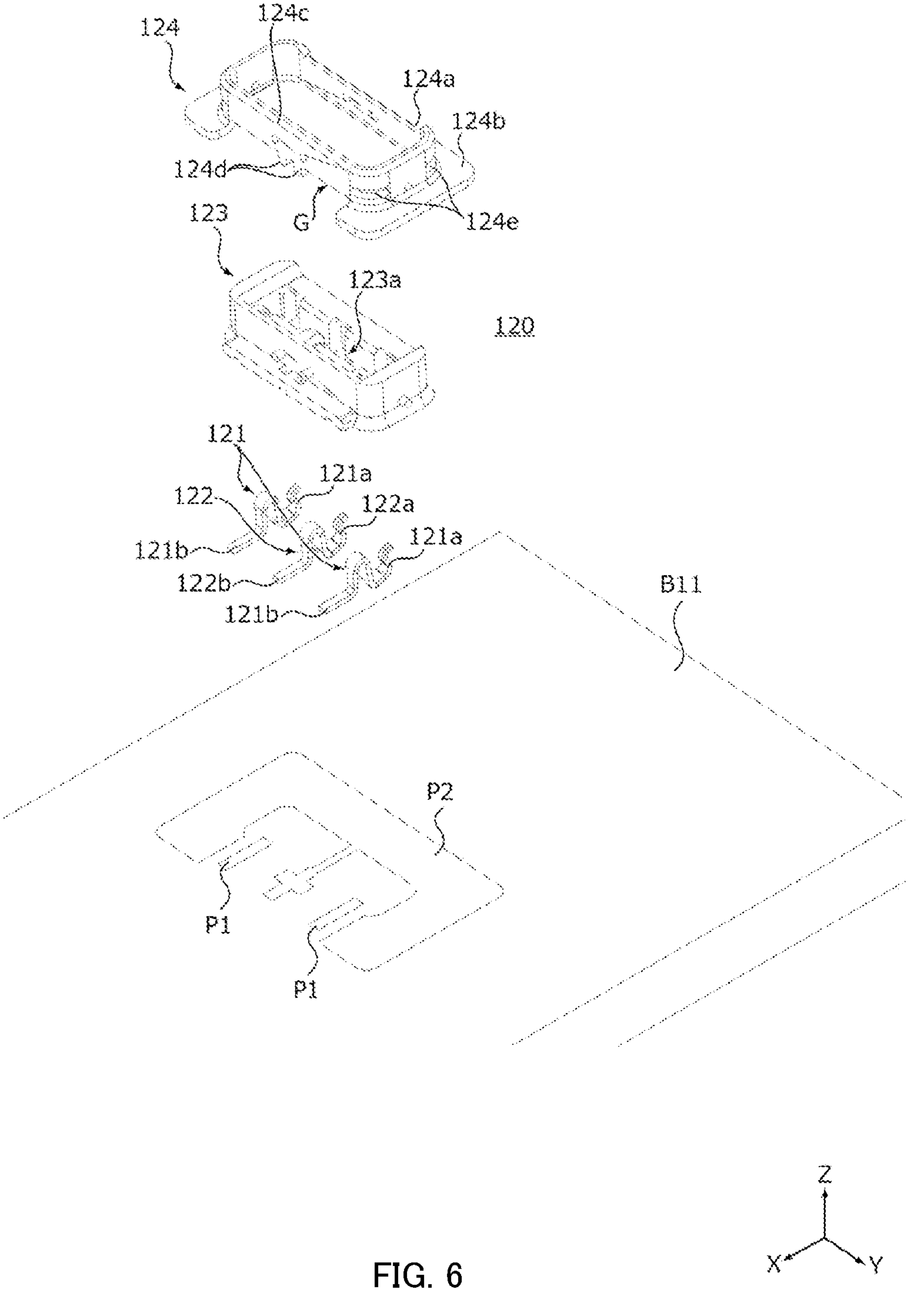
FIG. 6 is an exploded perspective view illustrating a receptacle connector according to the first embodiment.

When plug connector 100 and receptacle connector 120 are joined, signal line contact point part 101$a$ is brought into contact with and electrically connected to signal line contact point part 121$a$ of receptacle connector 120 (see FIG. 6).

To signal line connection part 101$b$, inner conductor 11 of coaxial cable 10 exposed by step-stripping at the tip end portion is connected by a mechanical bonding method such as soldering, welding and pressure bonding, for example.

Signal line relaying part 101$c$ is a part that connects signal line contact point part 101$a$ and signal line connection part 101$b$.

Two first plug contacts 101 are each extended in the X direction, and are disposed side by side in the Y direction, which is the pitch direction. In the present embodiment, signal line connection part 101$b$ and signal line relaying part 101$c$ have flat plate shapes extended in the XY plane, while signal line contact point part 101$a$ has a U-shape as viewed in the Y direction.

Second plug contact 102 is a ground member connected to the ground, which is the reference potential, and is electrically connected to ground pattern P2 of expansion card B11 through second receptacle contact 122 and receptacle shell 124 of receptacle connector 120. Second plug contact 102 is formed by sheet metal working (punching and bending) of a single metal plate, for example. Note that second plug contact 102 may be composed of a plurality of members as long as they are electrically connected to each other.

Second plug contact 102 includes ground contact point part 102*a*, shield connection part 102*b*, and ground relaying part 102*c*. Shield connection part 102*b* extends in the Y direction, and ground relaying part 102*c* (first relaying base part 102*d*) is connected to the center portion of shield connection part 102*b* in the Y direction and extended in the X direction. That is, second plug contact 102 has a T-shape as viewed from the Z direction.

Second plug contact 102 is disposed such that ground contact point part 102*a* and ground relaying part 102*c* are located between two first plug contacts 101. That is, two first plug contacts 101 are line-symmetrically disposed with respect to second plug contact 102.

Ground contact point part 102*a* is disposed between signal line contact point part 101*a* of first plug contact 101 so as to shield the part between signal line contact point parts 101*a*. As with signal line contact point part 101*a* of first plug contact 101, ground contact point part 102*a* has a U-shape as viewed in the Y direction. When plug connector 100 and receptacle connector 120 are joined, ground contact point part 102*a* is brought into contact with and electrically connected to second receptacle contact 122 of receptacle connector 120 (see FIG. 6). In addition, cover connecting part 102*h* is continuously provided at the tip end side (free end side) of ground contact point part 102*a*.

Together with ground bar 105, shield connection part 102*b* is electrically connected to outer shield layer 12 of coaxial cable 10. Shield connection part 102*b* and ground bar 105 collectively sandwich in the Z direction outer shield layers 12 of two coaxial cables 10 exposed by step-stripping at the tip end portion, and are connected by a mechanical bonding method such as soldering, welding and pressure bonding, for example.

Ground relaying part 102*c* is a part that connects ground contact point part 102*a* and shield connection part 102*b*. More specifically, ground relaying part 102*c* includes first relaying base part 102*d*, second relaying base part 102*e*, shielding part 102*f* and shell connecting part 102*g*. In addition, shielding part 102*f* includes interconnection shielding plates 21A and 21B and intermediate shielding plates 22A and 22B.

First relaying base part 102*d* and second relaying base part 102*e* have flat plate shapes extended in the XY plane. First relaying base part 102*d* is disposed on the – side in the X direction than second relaying base part 102*e*. In the present embodiment, shell connecting part 102*g* is provided between first relaying base part 102*d* and second relaying base part 102*e*. Note that shell connecting part 102*g* may be omitted, and in that case, first relaying base part 102*d* and second relaying base part 102*e* extend in the X direction as one piece.

Interconnection shielding plates 21A and 21B have flat plate shapes extended in the XZ plane provided to extend downward to the – side in the Z direction from both ends in the Y direction at first relaying base part 102*d*. Interconnection shielding plates 21A and 21B are located between signal line connection parts 101*b* of two first plug contacts 101 adjacent to each other in the Y direction, and are orthogonal to the opposing direction of two signal line connection parts 101*b*. In addition, the distances from interconnection shielding plates 21A and 21B to the proximate first plug contact 101 (signal line connection part 101*b*) are the same. That is, two signal line connection parts 101*b* are line-symmetrically disposed with respect to interconnection shielding plates 21A and 21B.

Intermediate shielding plates 22A and 22B have flat plate shapes extended in the XZ plane provided to extend downward to the – side in the Z direction from both ends of second relaying base part 102*e* in the Y direction at second relaying base part 102*e*. Intermediate shielding plates 22A and 22B are located between signal line relaying parts 101*c* of two first plug contacts 101 adjacent to each other in the Y direction, and are orthogonal to the opposing direction of two signal line relaying parts 101*c*.

In addition, the distances from intermediate shielding plates 22A and 22B to the proximate first plug contact 101 (signal line relaying part 101*c*) are the same. That is, two signal line relaying parts 101*c* are line-symmetrically disposed with respect to intermediate shielding plates 22A and 22B.

In addition, the lengths of intermediate shielding plates 22A and 22B in the Z direction are smaller than interconnection shielding plates 21A and 21B so as not to interfere with receptacle shell 124 when plug connector 100 and receptacle connector 120 are joined.

Shell connecting part 102*g* is provided between first relaying base part 102*d* and second relaying base part 102*e*. Shell connecting part 102*g* has a U-shape as viewed in the Y direction. When plug connector 100 and receptacle connector 120 are joined, shell connecting part 102*g* is brought into contact with and electrically connected to the outer surface of receptacle shell 124 (see FIG. 6) of receptacle connector 120.

In addition, in second plug contact 102, the top surfaces of cover connecting part 102*h*, first relaying base part 102*d*, second relaying base part 102*e* and shield connection part 102*b* are flush with each other, and make contact with the inner surface of cover shell 104.

Plug insulator 103 forms the housing of plug connector 100. First plug contact 101 and second plug contact 102 are assembled to plug insulator 103. First plug contact 101 and second plug contact 102 are formed integrally with plug insulator 103 by insert molding, for example. First plug contact 101 and second plug contact 102 are disposed in a separated state, and electrically isolated from each other by plug insulator 103.

Signal line contact point part 101*a* of first plug contact 101 and ground contact point part 102*a* of second plug contact 102 are disposed with the surface exposed at joining protrusion 103*a* of plug insulator 103. Signal line connection part 101*b* of first plug contact 101 and shield connection part 102*b* of second plug contact 102 are exposed from the inner surface side of plug insulator 103. In addition, the top surfaces of cover connecting part 102*h*, first relaying base part 102*d* and second relaying base part 102*e* of second plug contact 102 are exposed from opening 103*b* (including the notch) provided at the top surface of plug insulator 103.

Cover shell 104 is formed of a metal conductive material, and makes contact with the portion of second plug contact 102 exposed from plug insulator 103, i.e., cover connecting part 102*h*, first relaying base part 102*d*, second relaying base part 102*e* and shield connection part 102*b*.

In addition, shell contact point part 104*a* protruding to the inside is provided at the inner surface (in FIG. 4, etc., the inner surface of the wall extending along the Y direction) of cover shell 104. When plug connector 100 and receptacle connector 120 are joined, shell contact point part 104*a* of cover shell 104 elastically makes contact with side wall 124*c* of receptacle shell 124 (see FIG. 7B). Cover shell 104 is electrically connected to second plug contact 102 and set to the ground potential, and thus it can function as a shield.

Note that shell contact point part 104*a* may be a protrusion or a spring piece. In addition, a protrusion or a spring piece may be provided on the receptacle shell 124 side.

In addition, at the inner surface of cover shell 104, engaging protrusion 104*b* protruding to the inside is provided at the portion corresponding to engaging recess 124*e* (in FIG. 6, the four corners of body part 124*a*) of receptacle shell 124. When plug connector 100 and receptacle connector 120 are joined, engaging protrusion 104*b* of cover shell 104 engages with engaging recess 124*e* of receptacle shell 124.

Note that as with plug insulator 103, cover shell 104 may be formed of an insulating material such as synthetic resins so as to form the housing of plug connector 100.

In plug connector 100, ground contact point part 102*a* set to the ground potential is disposed between two signal line contact point parts 101*a*, thus shielding the part between signal line contact point parts 101*a*. In addition, interconnection shielding plates 21A and 21B of second plug contact 102 are disposed between two signal line connection parts 101*b*, thus shielding the part between signal line connection parts 101*b*. Further, intermediate shielding plates 22A and 22B of second plug contact 102 are disposed between two signal line relaying parts 101*c*, thus shielding the part between signal line relaying part 101*c*. In this manner, improvement in EMS characteristics (e.g., characteristic impedance, insertion loss, return loss, crosstalk and the like) of the transmission cable line can be achieved, and favorable transmission quality can be ensured.

In particular, in second plug contact 102, interconnection shielding plates 21A and 21B and intermediate shielding plates 22A and 22B are three-dimensionally formed to extend in the XZ plane, and thus the parts between signal line connection parts 101*b* and between signal line relaying parts 101*c* of first plug contact 101 are reliably shielded.

In addition, two interconnection shielding plates 21A and 21B and two intermediate shielding plates 22A and 22B are provided so as to provide an equal ground structure for first plug contact 101, and thus the transmission quality of the two signal transmission cable lines is stabilized. More specifically, since interconnection shielding plates 21A and 21B and intermediate shielding plates 22A and 22B are formed by bending at both end portions of first relaying base part 102*d* and second relaying base part 102*e* in the width direction, the distance from first plug contact 101 can be easily adjusted by setting the bending position, thus achieving easy impedance control.

FIG. 6 is an exploded perspective view illustrating receptacle connector 120 as viewed from the + side in the Z direction on which it is joined to plug connector 100 (hereinafter referred to as "joined side").

As illustrated in FIG. 6, receptacle connector 120 includes first receptacle contact 121, second receptacle contact 122, receptacle insulator 123 and receptacle shell 124.

First receptacle contact 121, second receptacle contact 122 and receptacle shell 124 are formed of a conductive material such as metal (e.g., copper alloy). Receptacle insulator 123 is formed of an insulating material such as a synthetic resin (e.g., liquid crystal polymer).

First receptacle contact 121 and second receptacle contact 122 have the same shape, and are disposed side by side in the Y direction at joining recess 123*a* of receptacle insulator 123.

First receptacle contact 121 includes signal line contact point part 121*a* and signal line surface mounting part 121*b*. Second receptacle contact 122 includes ground contact point part 122*a* and ground surface mounting part 122*b*.

Signal line contact point part 121*a* and ground contact point part 122*a* are brought into contact with and electrically connected to signal line contact point part 101*a* and ground contact point part 102*a* of plug connector 100 when plug connector 100 and receptacle connector 120 are joined. More specifically, signal line contact point part 121*a* and ground contact point part 122*a* are each curved in a U-shape as viewed in the Y direction, and each include, at the tip end portion as a free end, a spring piece (whose reference numeral is omitted) that generates a biasing force to the opposite surface.

Signal line surface mounting part 121*b* and ground surface mounting part 122*b* are drawn from the lower portion of side wall 124*c* of receptacle shell 124 on the + side in the X direction, and connected to signal pattern P1 and ground pattern P2 of expansion card B11 by soldering, for example.

Receptacle shell 124 is a frame body connected to ground pattern P2 of expansion card B11, and has a rectangular shape corresponding to the outer edge of receptacle insulator 123 in plan view as viewed from the Z direction. Receptacle shell 124 is formed by drawing a metal plate, for example. Receptacle shell 124 includes cylindrical body part 124*a* and flange part 124*b*. Flange part 124*b* is provided continuously and protruded outward at the end portion on the – side in the Z direction at three side walls (two side walls facing in the Y direction and one side wall located on the – side in the X direction) of body part 124*a*. In addition, in body part 124*a*, gap G for drawing first receptacle contact 121 and second receptacle contact 122 is provided at the lower portion of side wall 124*c* located on the + side in the X direction.

Flange part 124*b* is a ground connection part connected to ground pattern P2 of expansion card B11. The shape of flange part 124*b* corresponds to the shape of ground pattern P2. Flange part 124*b* is connected to ground pattern P2 of expansion card B11 by soldering, for example.

In addition, shell shielding part 124*d* that is connected to ground pattern P2 of expansion card B11 over second receptacle contact 122 is provided at the portion corresponding to the portion where second receptacle contact 122 is drawn in side wall 124*c* of receptacle shell 124. With shell shielding part 124*d*, side wall 124*c* located directly above surface mounting parts 121*b* and 122*b* of first receptacle contact 121 and second receptacle contact 122 is connected to the ground at the shortest distance.

In addition, side wall 124*c* makes contact with shell contact point part 104*a* of cover shell 104 in the region above shell shielding part 124*d*. Thus, the ground potential of receptacle shell 124 is equalized, and improvement in EMS characteristics of the transmission cable line can be achieved, thus ensuring favorable transmission quality.

Receptacle insulator 123 has a rectangular shape in plan view as viewed from the Z direction, and forms the housing of receptacle connector 120. At receptacle insulator 123, plug insulator 103 can be joined.

First receptacle contact 121, second receptacle contact 122 and receptacle shell 124 are assembled to receptacle insulator 123. First receptacle contact 121 and second receptacle contact 122 are formed integrally with receptacle insulator 123 by insert molding, for example. Receptacle shell 124 is engaged with the peripheral portion of receptacle insulator 123.

Figure 7A:
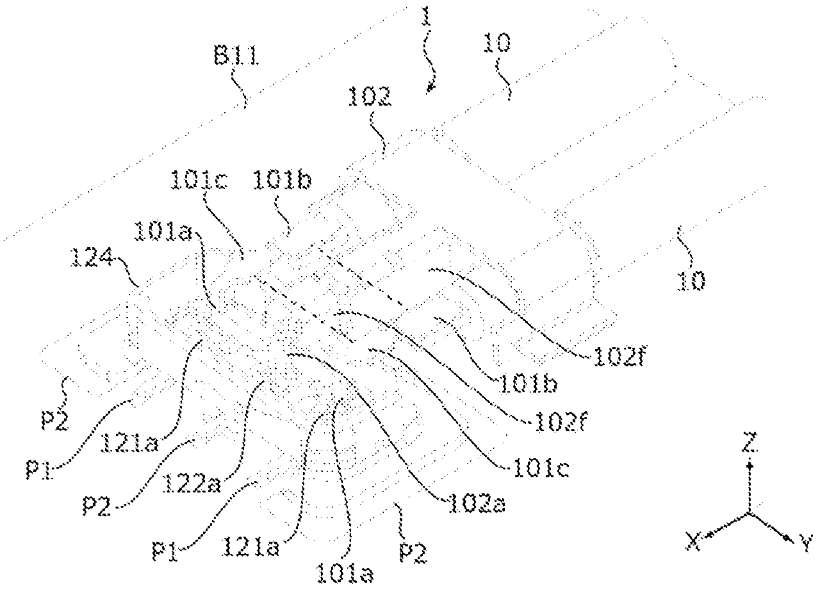
FIGS. 7A and 7B are perspective views illustrating a connector set according to the first embodiment joined state.
Figure 7B:
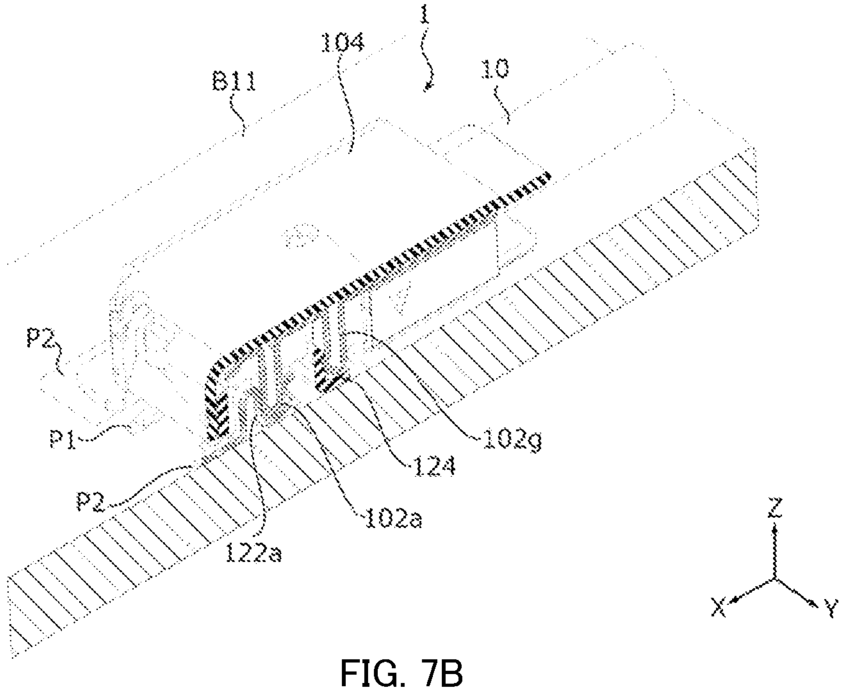

FIGS. 7A and 7B are perspective views illustrating a joined state of a connector set according to the embodiment. FIG. 7B is a cross-sectional view illustrating second plug contact 102 taken along the X direction. Note that in FIG. 7A, plug insulator 103, cover shell 104 and receptacle insulator 123 are omitted for the sake of clearly illustrating the joined state of the contact.

As illustrated in FIGS. 7A and 7B, when plug connector 100 and receptacle connector 120 are joined, signal line contact point part 101*a* of first plug contact 101 is inserted and joined, and electrically connected to signal line contact point part 121*a* of first receptacle contact 121. In addition, ground contact point part 102*a* of second plug contact 102 is inserted and joined, and electrically connected to ground contact point part 122*a* of second receptacle contact 122.

Further, shell connecting part 102*g* of second plug contact 102 makes contact with the outer surface (the outer surface of the side wall opposite to side wall 124*c*) of body part 124*a* of receptacle shell 124. In addition, engaging protrusion 104*b* of cover shell 104 and engaging recess 124*e* of receptacle shell 124 are engaged with each other, and shell contact point part 104*a* of cover shell 104 makes contact with the outer surface of side wall 124*c* of receptacle shell 124. Receptacle connector 120 is sandwiched by second plug contact 102 and cover shell 104, and thus the joined state is stably maintained.

In this manner, connector set 1 according to the first embodiment has the following features, alone or in combination as appropriate.

Specifically, in connector set 1, plug connector 100 is an electric wire-to-board connector that connects expansion card B11 and the plurality of coaxial cables 10 used for high-frequency signal transmission when joined with receptacle connector 120 (mating connector) mounted on expansion card B11 (circuit board). Plug connector 100 includes a plurality of first plug contacts 101 (first contacts) connected to respective inner conductors 11 of the plurality of coaxial cables 10, and second plug contact 102 (second contact) connected to the ground, which is the reference potential. Further, second plug contact 102 includes shielding part 102*f* disposed between the plurality of first plug contacts 101, and shielding part 102*f* includes two interconnection shielding plates 21A and 21B provided orthogonal to the opposing direction (the Y direction) of signal line connection parts 101*b* between signal line connection parts 101*b* of adjacent first plug contact 101.

With connector set 1, improvement in EMS characteristics (e.g., characteristic impedance, insertion loss, return loss, crosstalk and the like) of the transmission cable line can be achieved, and favorable transmission quality can be ensured. In addition, the plurality of coaxial cables 10 can be collectively connected to expansion card B11 and/or relaying FPC board B21. Thus, it is possible to meet the requirement of an intra-apparatus wiring of a communication device, and in particular achieve improvement in high-speed transmission characteristics, improvement in connectivity of coaxial cable 10, and size reduction of expansion card B11 and relaying FPC board B21 as the connection targets.

In addition, in plug connector 100, the distances from interconnection shielding plates 21A and 21B to the proximate first plug contact 101 are the same. With interconnection shielding plates 21A and 21B, an equal ground structure can be formed for first plug contact 101, and thus the transmission quality of the two signal transmission cable lines is stabilized.

In addition, in plug connector 100, shielding part 102*f* includes two intermediate shielding plates 22A and 22B provided orthogonal to the opposing direction (the Y direction) of signal line relaying parts 101*c* between signal line relaying parts 101*c* of adjacent first plug contacts 101. In this manner, further improvement in EMS characteristics of the transmission cable line can be achieved, and favorable transmission quality can be ensured.

In addition, in plug connector 100, the distances from intermediate shielding plates 22A and 22B to the proximate first plug contact 101 are the same. With intermediate shielding plates 22A and 22B, an equal ground structure can be formed for first plug contact 101, and thus the transmission quality of the two signal transmission cable lines is further stabilized.

In addition, in plug connector 100, second plug contact 102 (second contact) includes shell connecting part 102*g* connected to receptacle shell 124 (mating shell) of receptacle connector 120 (mating connector). In this manner, second plug contact 102 can be reliably connected to the ground through receptacle shell 124.

In addition, in plug connector 100, shell connecting part 102*g* is provided between interconnection shielding plates 21A and 21B and intermediate shielding plates 22A and 22B. In this manner, second plug contact 102 can be connected to receptacle shell 124 with a simple structure.

In addition, in plug connector 100, second plug contact 102 (second contact) includes shield connection part 102*b* connected to the outer shield layers 12 of the plurality of coaxial cables 10. In this manner, shielding part 102*f* and shield connection part 102*b* can be provided as a single member, and thus the component configuration can be simplified.

In addition, in plug connector 100, second plug contact 102 (second contact) includes first relaying base part 102*d* and second relaying base part 102*e* (relaying base part) connected in a T-shape to shield connection part 102*b*, and shielding part 102*f* is provided vertically at both end portions of first relaying base part 102*d* and second relaying base part 102*e* in the width direction. In this manner, shielding part 102*f* can be easily formed by bending.

In addition, plug connector 100 further includes cover shell 104 that physically makes contact with first relaying base part 102*d* and second relaying base part 102*e* (relaying base part), and is electrically connected to second plug contact 102 (second contact). In this manner, the ground structure of plug connector 100 is further reinforced.

In addition, in plug connector 100, cover shell 104 is connected to receptacle shell 124 (mating shell), and sandwiches receptacle shell 124 together with shell connecting part 102*g*. In this manner, the ground structure is reinforced, and the joined state of plug connector 100 and receptacle connector 120 can be stably maintained.

Second Embodiment

Figure 8:
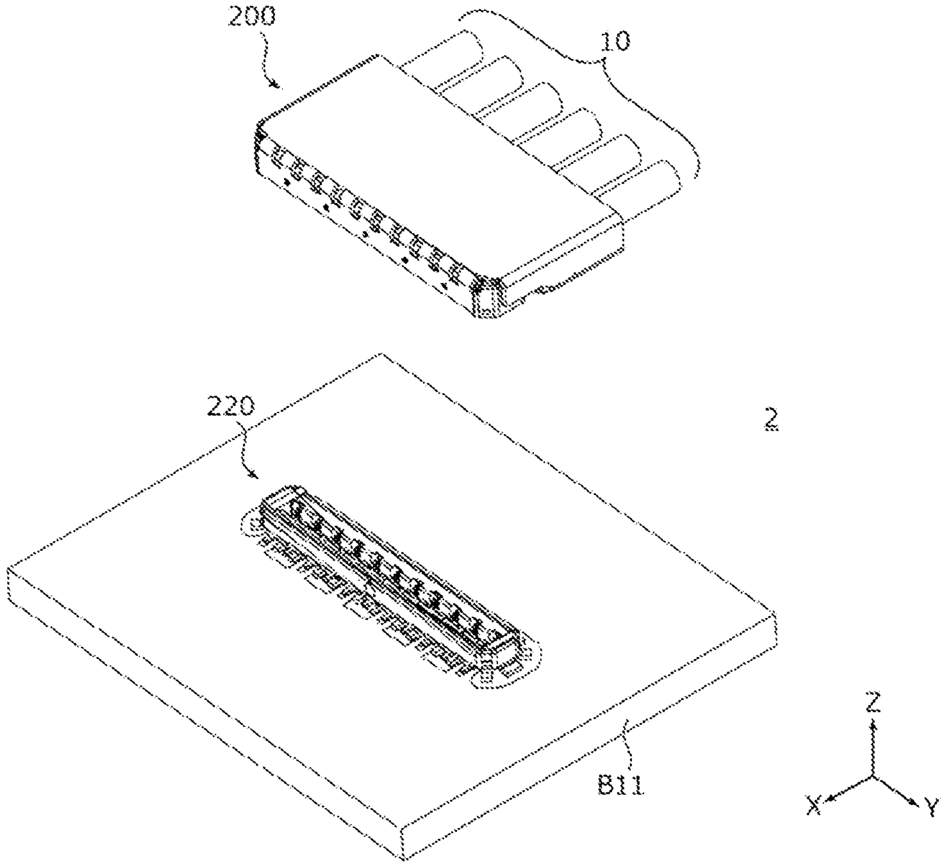
FIG. 8 is a perspective view illustrating an external appearance of a connector set according to a second embodiment.

FIG. 8 is a perspective view illustrating an external appearance of connector set 2 according to a second embodiment to which the present invention is applied. FIG. 8 illustrates a disassembled state of connector set 2, i.e., a state before plug connector 200 and receptacle connector 220 are joined.

As illustrated in FIG. 8, connector set 2 includes plug connector 200 and receptacle connector 220. Plug connector

200 is attached to one end of coaxial cable 10, and used as a connector-equipped cable. Receptacle connector 220 is mounted on expansion card B11.

Connector set 2 according to the second embodiment is different in that six coaxial cables 10 are connected, from connector set 1 of the first embodiment in which two coaxial cables 10 are connected. The main configurations of plug connector 200 and receptacle connector 220 are substantially the same as those of plug connector 100 and receptacle connector 120 of the first embodiment, and therefore the description thereof is omitted or simplified.

Connector set 2 electrically connects coaxial cable 10 and expansion card B11 when plug connector 200 and receptacle connector 220 are joined. More specifically, inner conductor 11 of coaxial cable 10 is electrically connected to signal pattern P1 of expansion card B11 through first plug contact 201 of plug connector 200 and first receptacle contact 221 of receptacle connector 220 (see FIG. 12). In addition, outer shield layer 12 of coaxial cable 10 is electrically connected to ground pattern P2 of expansion card B11 through second plug contact 202 of plug connector 200 and second receptacle contact 222 and receptacle shell 224 of receptacle connector 220 (see FIG. 12).

Detailed configurations of plug connector 200 and receptacle connector 220 are described below.

Figure 9:
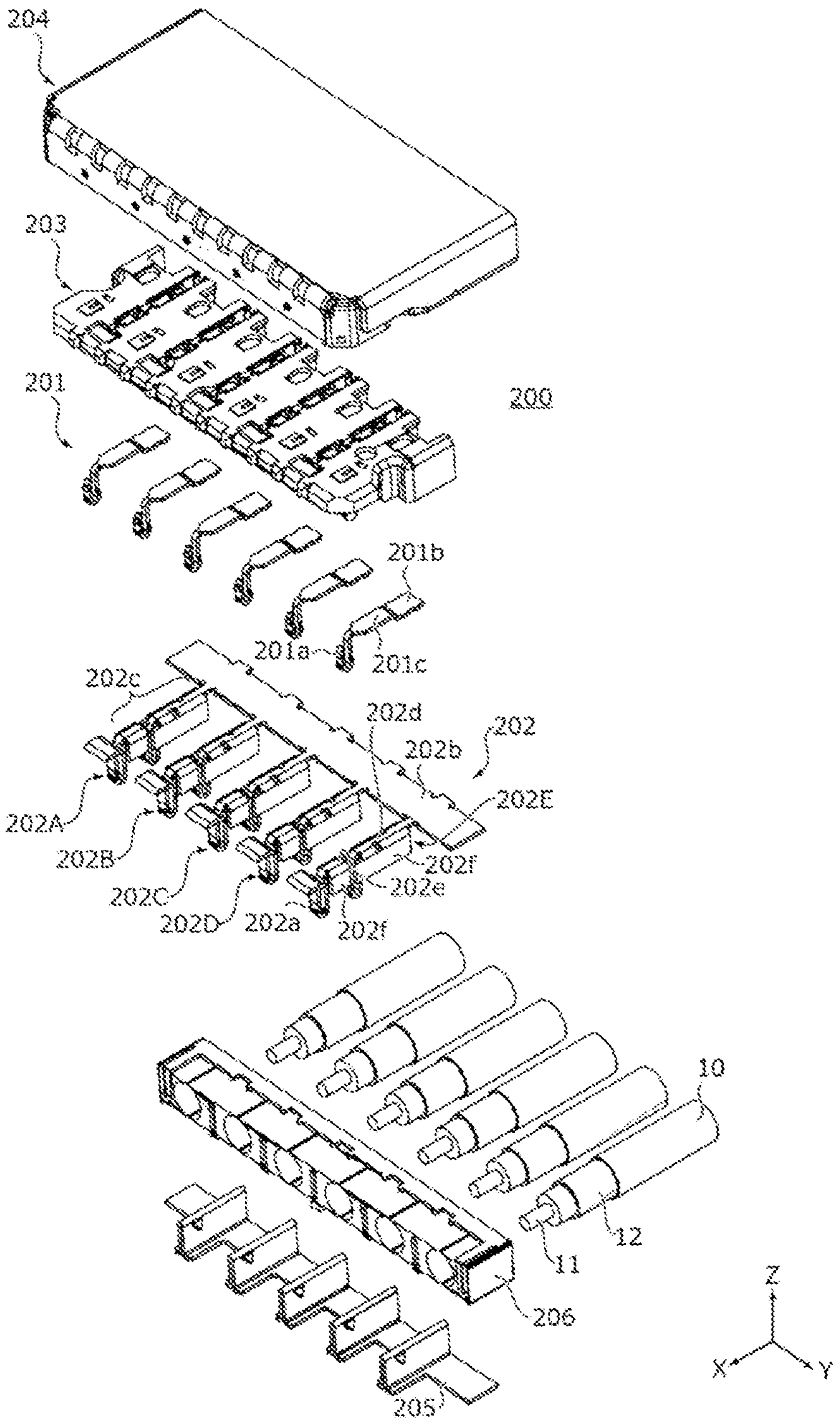
FIG. 9 is an exploded perspective view illustrating a plug connector according to the second embodiment.
Figure 10:
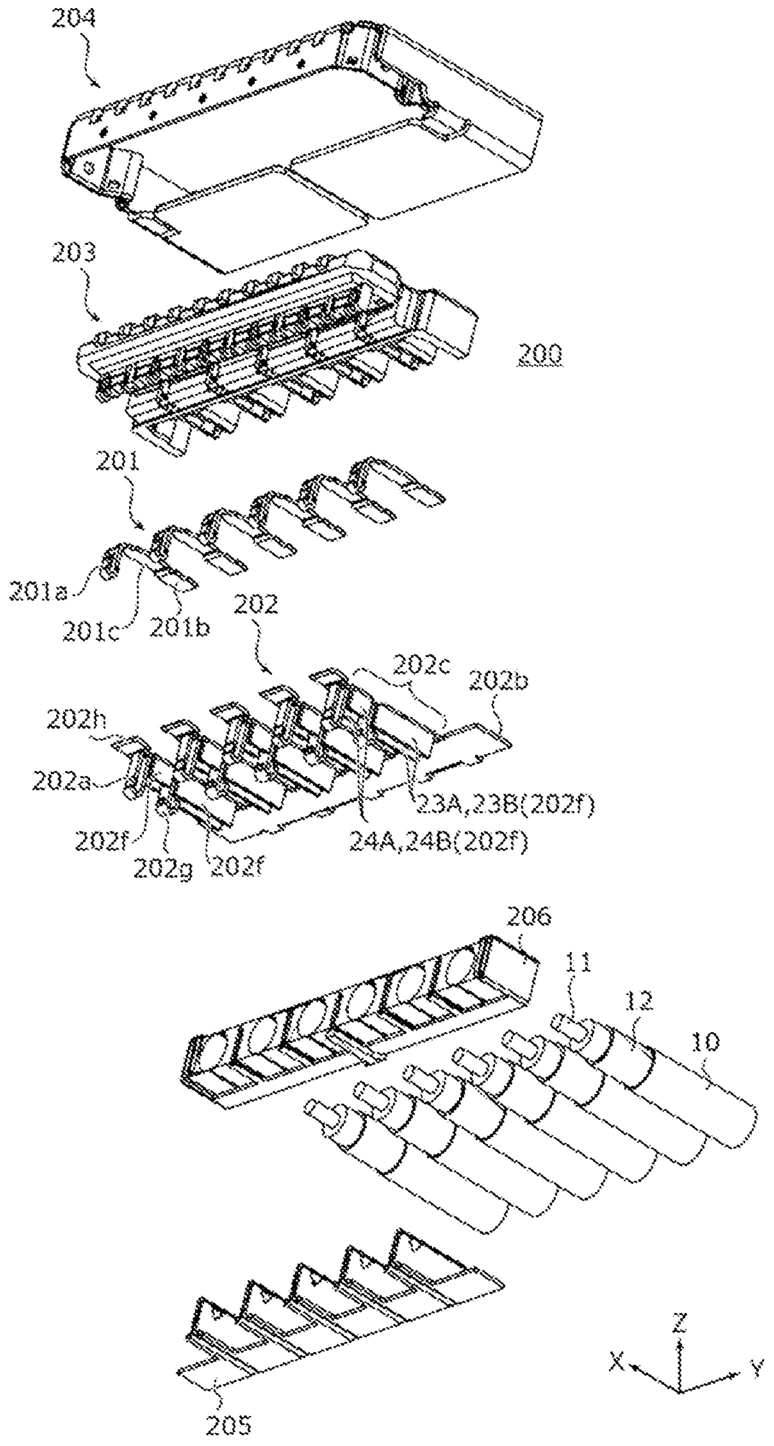
FIG. 10 is an exploded perspective view illustrating the plug connector according to the second embodiment.

FIG. 9 is an exploded perspective view illustrating plug connector 200 as viewed from the + side in the Z direction, and FIG. 10 is an exploded perspective view illustrating plug connector 200 as viewed from the opposite side, i.e., the − side in the Z direction.

As illustrated in FIGS. 9 and 10, plug connector 200 includes first plug contact 201, second plug contact 202, plug insulator 203, cover shell 204 and the like.

Six first plug contacts 201 have the same configuration, and each of which includes signal line contact point part 201*a*, signal line connection part 201*b* and signal line relaying part 201*c*. Six first plug contacts 201 are each extended in the X direction, and are disposed side by side in the Y direction, which is the pitch direction. The structure and function of first plug contact 201 are the same as those of first plug contact 101 of the first embodiment.

Second plug contact 202 includes five ground contact parts 202A to 202E. Each of ground contact parts 202A to 202E includes ground contact point part 202*a*, shield connection part 202*b*, and ground relaying part 202*c*. In addition, ground relaying part 202*c* includes first relaying base part 202*d*, second relaying base part 202*e*, shielding part 202*f* and shell connecting part 202*g*. In addition, shielding part 202*f* includes interconnection shielding plates 23A and 23B and intermediate shielding plates 24A and 24B. Shield connection parts 202*b* of ground contact parts 202A to 202E are coupled with each other in a plate shape extending in the Y direction. The structures and functions of ground contact parts 202A to 202E are substantially the same as those of second plug contact 102 of the first embodiment.

Second plug contact 202 is disposed such that ground contact point parts 202*a* and ground relaying parts 202*c* of ground contact parts 202A to 202E are located between two adjacent first plug contacts 201. That is, two first plug contacts 201 are line-symmetrically disposed with respect to ground contact parts 202A to 202E of second plug contact 202.

Ground contact point part 202*a* is disposed between signal line contact point parts 201*a* of first plug contact 201 so as to shield the part between signal line contact point parts 201*a*. When plug connector 200 and receptacle connector 220 are joined, ground contact point part 202*a* is brought into contact with and electrically connected to second receptacle contact 222 of receptacle connector 220 (see FIG. 11).

Together with ground bar 205, shield connection part 202*b* is electrically connected to outer shield layer 12 of coaxial cable 10. Shield connection part 202*b* and ground bar 205 collectively sandwich in the Z direction outer shield layers 12 of six coaxial cables 10 exposed by step-stripping at the tip end portion, and are connected by a mechanical bonding method such as soldering, welding and pressure bonding, for example. In the present embodiment, after shield connection part 202*b* and ground bar 205 are bonded to outer shield layer 12, cable holding member 206 composed of an insulating material is formed through outer mold for the purpose of ensuring the strength, and thus outer shield layer 12, shield connection part 202*b* and ground bar 205 are integrated with each other.

First plug contact 201 and second plug contact 202 are assembled to plug insulator 203 in a mutually separated state.

In plug connector 200, ground contact point part 202*a* with the ground potential is disposed between adjacent two signal line contact point parts 201*a*, and thus the part between signal line contact point parts 201*a* is shielded. In addition, interconnection shielding plates 23A and 23B of second plug contact 202 are disposed between adjacent two signal line connection parts 201*b*, and thus the part between signal line connection parts 201*b* is shielded. Further, intermediate shielding plates 24A and 24B of second plug contact 202 are disposed between adjacent two signal line relaying parts 201*c*, and thus the part between signal line relaying parts 201*c* is shielded. In this manner, improvement in EMS characteristics (e.g., characteristic impedance, insertion loss, return loss, crosstalk and the like) of the transmission cable line can be achieved, and favorable transmission quality can be ensured.

In particular, in second plug contact 202, interconnection shielding plates 23A and 23B and intermediate shielding plates 24A and 24B are three-dimensionally formed to extend in the XZ plane, and thus the parts between signal line connection parts 201*b* and between signal line relaying parts 201*c* of first plug contact 201 are reliably shielded.

In addition, with two interconnection shielding plates 23A and 23B and two intermediate shielding plates 24A and 24B, an equal ground structure for first plug contact 201 is provided, and thus the transmission quality of the two adjacent signal transmission cable lines is stabilized. More specifically, since interconnection shielding plates 23A and 23B and intermediate shielding plates 24A and 24B are formed by bending at both end portions of first relaying base part 202*d* and second relaying base part 202*e* in the width direction, the distance from first plug contact 201 can be easily adjusted by setting the bending position, thus achieving easy impedance control.

Figure 11:
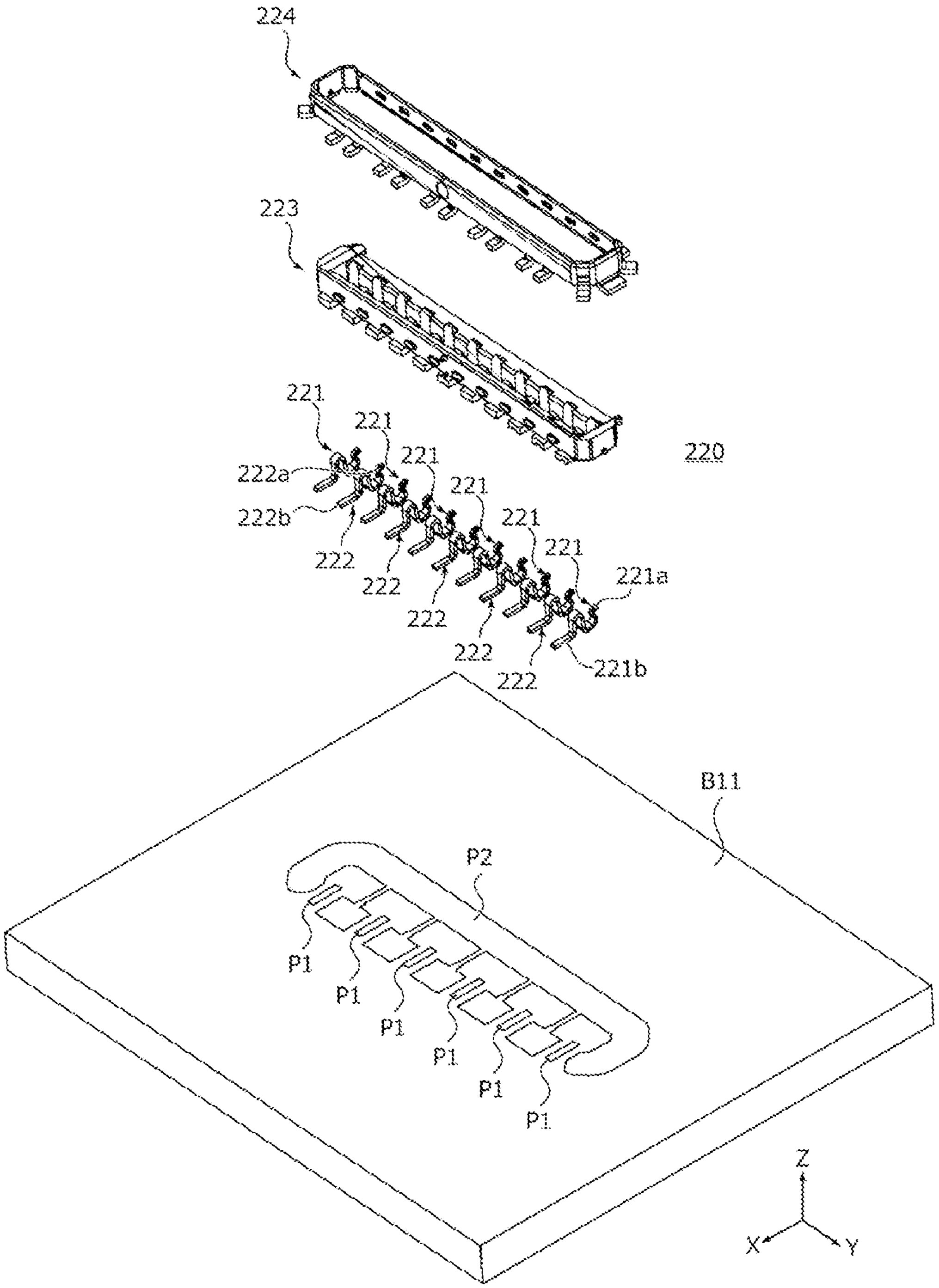
FIG. 11 is an exploded perspective view illustrating a receptacle connector according to the second embodiment.

FIG. 11 is an exploded perspective view illustrating receptacle connector 220 as viewed from the + side in the Z direction (hereinafter referred to as "joined side") on which it is joined to plug connector 200.

As illustrated in FIG. 11, receptacle connector 220 includes first receptacle contact 221, second receptacle contact 222, receptacle insulator 223 and receptacle shell 224.

Six first receptacle contacts 221 and five second receptacle contacts 222 have the same shape, and are disposed alternately in the Y direction at the joining recess (whose reference numeral is omitted) of receptacle insulator 223.

First receptacle contact 221 includes signal line contact point part 221*a* and signal line surface mounting part 221*b*. Second receptacle contact 222 includes ground contact point part 222*a* and ground surface mounting part 222*b*. The structures and functions of first receptacle contact 221 and second receptacle contact 222 are the same as those of receptacle contact 121 and second receptacle contact 122 of the first embodiment.

First receptacle contact 221 and second receptacle contact 222 are assembled in a mutually separated state to receptacle insulator 223.

Figure 12:
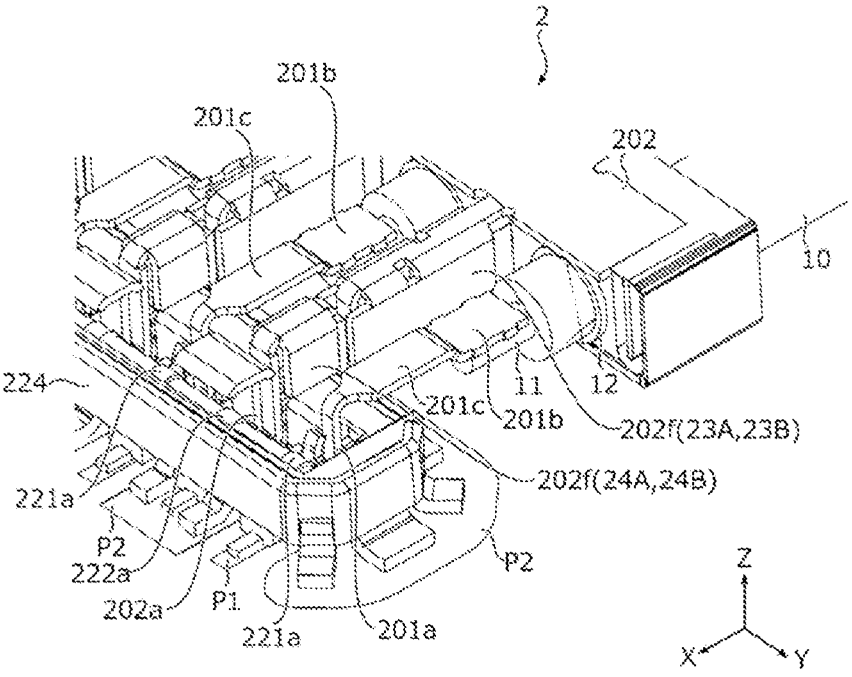
FIG. 12 is a perspective view illustrating a joined state of the connector set according to the second embodiment.

FIG. 12 is a perspective view illustrating a joined state of connector set 2 according to the second embodiment. Note that in FIG. 12, plug insulator 203, cover shell 204 and receptacle insulator 223 are omitted, and a part of the + side in the Y direction is illustrated in an enlarged manner for the sake of clearly illustrating the joined state of the contact.

As illustrated in FIG. 12, when plug connector 200 and receptacle connector 220 are joined, signal line contact point part 201*a* of first plug contact 201 is inserted and joined, and electrically connected to signal line contact point part 221*a* of first receptacle contact 221. In addition, ground contact point part 202*a* of second plug contact 202 is inserted and joined, and electrically connected to ground contact point part 222*a* of second receptacle contact 222.

Further, shell connecting part 202*g* of second plug contact 202 makes contact with the outer surface of the body part of receptacle shell 224. Receptacle connector 220 is sandwiched by second plug contact 202 and cover shell 204. In this manner, the joined state of connector set 2 is stably maintained.

As described above, connector set 2 according to the second embodiment has the following features, alone or in combination as appropriate.

Specifically, in connector set 2, plug connector 200 is an electric wire-to-board connector that connects the plurality of coaxial cables 10 used for high-frequency signal transmission and expansion card B11 when joined with receptacle connector 220 (mating connector) mounted on expansion card B11 (circuit board), and includes six first plug contacts 201 (first contacts) connected to inner conductors 11 of the plurality of coaxial cables 10, and second plug contact 202 (second contact) connected to the ground, which is the reference potential. Further, second plug contact 202 includes shielding part 202*f* disposed between the plurality of first plug contacts 201, and shielding part 202*f* includes two interconnection shielding plates 23A and 23B provided orthogonal to the opposing direction (the Y direction) of signal line connection parts 201*b* between signal line connection parts 201*b* of adjacent first plug contacts 201.

With connector set 2, improvement in EMS characteristics (e.g., characteristic impedance, insertion loss, return loss, crosstalk and the like) of the transmission cable line can be achieved, and favorable transmission quality can be ensured. In addition, it is possible to collectively connect the plurality of coaxial cables 10 to expansion card B11 and relaying FPC board B21. Thus, it is possible to meet the requirement of an intra-apparatus wiring of a communication device, and in particular achieve improvement in high-speed transmission characteristics, improvement in connectivity of coaxial cable 10 and size reduction of expansion card B11 and relaying FPC board B21 as the connection targets.

In addition, in plug connector 200, the distances from two interconnection shielding plates 23A and 23B to the proximate first plug contact 201 are the same. With interconnection shielding plates 23A and 23B, the equal ground structure for first plug contact 201 is formed, and thus the transmission quality of the two adjacent signal transmission cable lines is stabilized.

In addition, in plug connector 200, shielding part 202*f* includes two intermediate shielding plates 24A and 24B provided orthogonal to the opposing direction (the Y direction) of signal line relaying parts 201*c* between signal line relaying parts 201*c* of the adjacent first plug contact 201. In this manner, further improvement in EMS characteristics of the transmission cable line can be achieved, and favorable transmission quality can be ensured.

In addition, in plug connector 200, the distances from two intermediate shielding plates 24A and 24B to the proximate first plug contact 201 are the same. With intermediate shielding plates 24A and 24B, the equal ground structure for first plug contact 201 is formed, and thus the transmission quality of the two adjacent signal transmission cable lines is further stabilized.

In addition, in plug connector 200, second plug contact 202 (second contact) includes shell connecting part 202*g* connected to receptacle shell 224 (mating shell) of receptacle connector 220 (mating connector). In this manner, second plug contact 202 can be reliably connected to the ground through receptacle shell 224.

In addition, in plug connector 200, shell connecting part 202*g* is provided between interconnection shielding plates 23A and 23B and intermediate shielding plates 24A and 24B. In this manner, with a simple structure, second plug contact 202 can be connected to receptacle shell 224.

In addition, in plug connector 200, second plug contact 202 (second contact) includes shield connection part 202*b* connected to outer shield layers 12 of the plurality of coaxial cables 10. In this manner, shielding part 202*f* and shield connection part 202*b* can be provided as a single member, and thus the component configuration can be simplified.

In addition, in plug connector 200, ground contact parts 202A to 202E (second contact) of second plug contact 202 include first relaying base part 202*d* and second relaying base part 202*e* (relaying base part) connected in a T-shape to shield connection part 202*b*, and shielding part 202*f* is provided vertically at both end portions of first relaying base part 202*d* and second relaying base part 202*e* in the width direction. In this manner, shielding part 202*f* can be easily formed by bending.

In addition, plug connector 200 further includes cover shell 204 that makes physical contact with first relaying base part 202*d* and second relaying base part 202*e* (relaying base part) and is electrically connected to second plug contact 202 (second contact). In this manner, the ground structure of plug connector 200 is further reinforced.

In addition, in plug connector 200, cover shell 204 is connected to receptacle shell 224 (mating shell), so as to sandwich receptacle shell 224 together with shell connecting part 202*g*. In this manner, the ground structure is reinforced, and the joined state of plug connector 200 and receptacle connector 220 can be stably maintained.

The invention made by the present inventor has been described specifically based on the above embodiments. The invention is not limited to the above embodiments, but can be modified to the extent not to depart from the gist thereof.

For example, the specific structures of plug connectors 100 and 200 and receptacle connectors 120 and 220 are not limited to the embodiment, and may be appropriately changed. In addition, the number of coaxial cables 10 may be appropriately changed. For example, connector set 1 may be configured to collectively connect all of (e.g., six or eight) coaxial cables mounted on M.2 compliant expansion card B11.

Figure 13A:
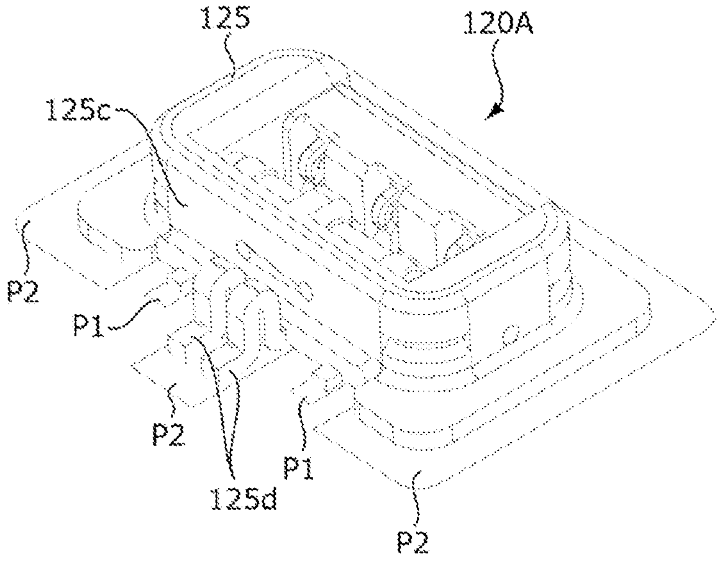
FIGS. 13A and 13B are perspective views illustrating a receptacle connector according to a modification.
Figure 13B:
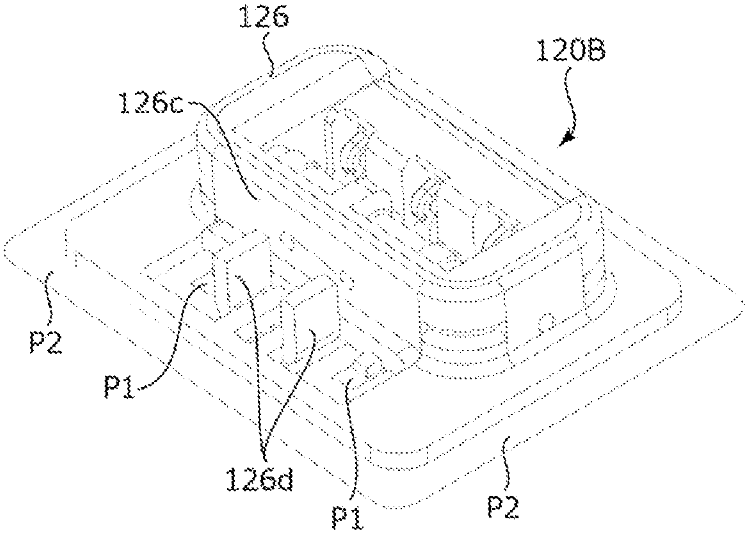

FIGS. 13A and 13B are perspective views illustrating a receptacle connector of a modification. In receptacle connector 120A illustrated in FIG. 13A, shell shielding parts 125*d* of receptacle shell 125 are continuously provided at the lower end portion of side wall 125*c* and drawn to the outside in a bent U-shape. In addition, in receptacle connector 120B illustrated in FIG. 13B, shell shielding parts 126*d* of receptacle shell 126 are continuously provided at the lower end portion of side wall 126*c* and drawn to the outside in a plate shape. In this manner, the EMS characteristics can be further improved by modifying the structures of shell shielding parts 125*d* and 126*d* of receptacle shells 125 and 126 of receptacle connectors 120A and 120B.

Figure 14:
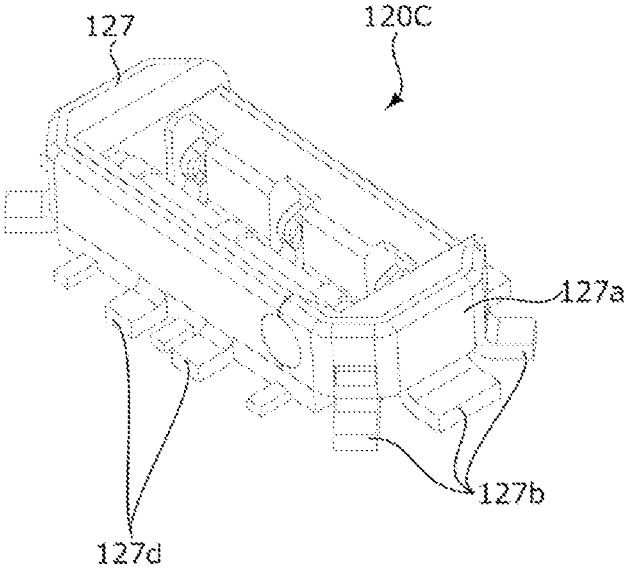
FIG. 14 is a perspective view illustrating a receptacle connector according to a modification.

In addition, the receptacle connector may include the structure illustrated in FIG. 14. Specifically, in receptacle connector 120C illustrated in FIG. 14, flange part 127*b* and shell shielding part 127*d* of receptacle shell 127 are formed by bending at the lower end portion of body part 127*a*. This remarkably increases the ease of the processing in comparison with the drawing, and thus mass productivity is improved.

Figure 15A:
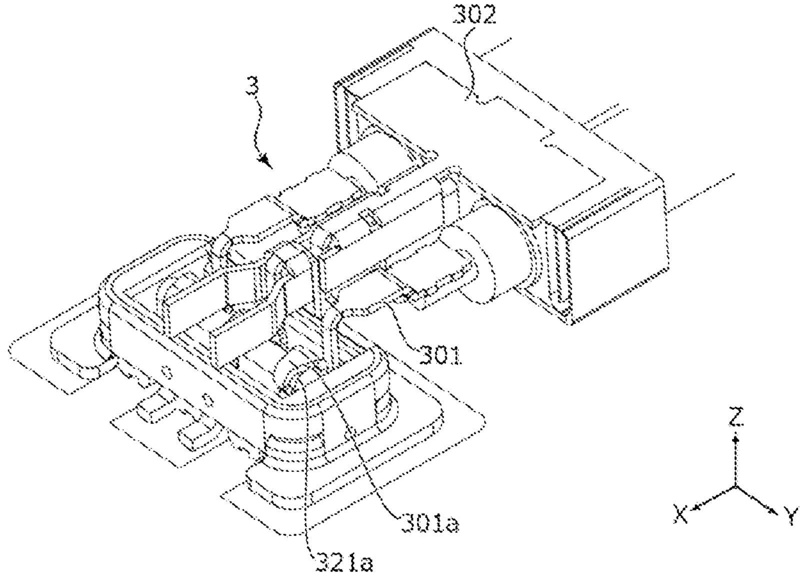
FIGS. 15A and 15B are perspective views illustrating a connector set according to a modification.

In the embodiment, the configuration in which the first connector on the cable side is the plug connector and the second connector on the board side is the receptacle connector is described, but the present invention may be applied to connector set 3 with a configuration in which the first connector on the cable side is the receptacle connector and the second connector each on the board side is the plug connector (see FIG. 15A, etc.).

Figure 15B:
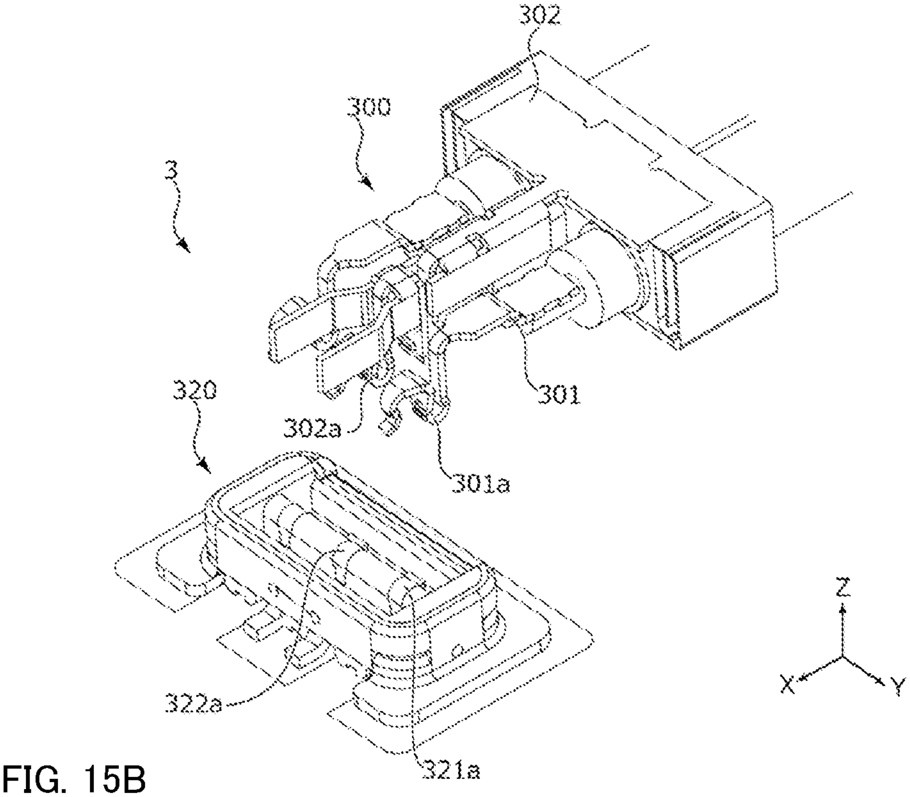
Figure 16A:
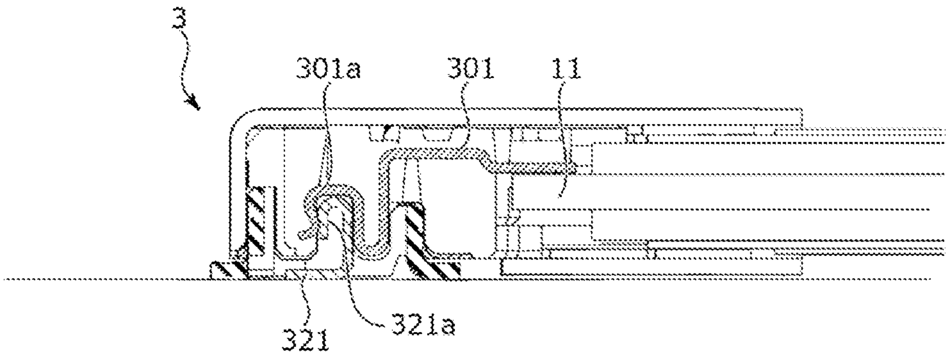
FIGS. 16A and 16B are sectional views illustrating a connector set according to a modification.
Figure 16B:
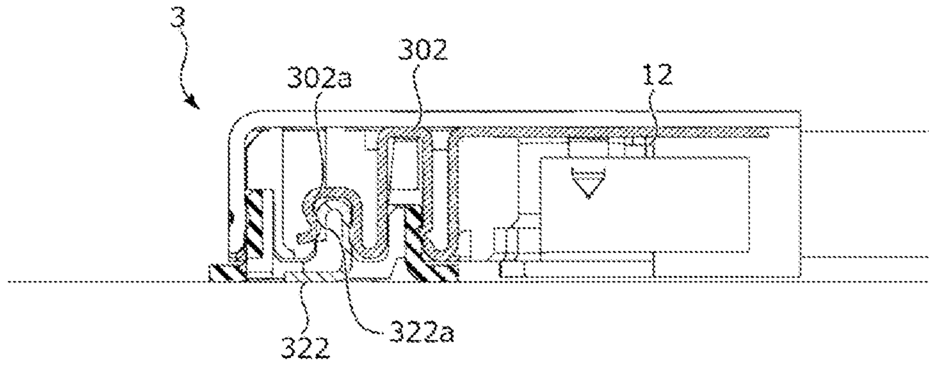

FIGS. 15A and 15B are perspective views illustrating connector set 3. In FIGS. 15A and 15B, the cover, insulator and the like of cable side connector 300 are omitted. FIGS. 16A and 16B are sectional views illustrating connector set 3. FIG. 16A illustrates a connecting portion of signal contacts 301 and 321, and FIG. 16B illustrates a connecting portion of ground contacts 302 and 322.

As illustrated in FIG. 15A, etc., protruded signal line contact point part 321*a* of signal contact 321 (first mating contact) of board side connector 320 is inserted to recessed signal line contact point part 301*a* of signal contact 301 (first contact) of cable side connector 300. In addition, protruded signal line contact point part 322*a* of ground contact 322 (second mating contact) of board side connector 320 is inserted to recessed ground contact point part 302*a* of ground contact 302 (second contact) of cable side connector 300.

The embodiments disclosed here are in all respects to be considered illustrative and not restrictive. The scope of the invention is indicated by the claims, not by the above description, and is intended to include all modifications within the meaning and scope equivalent to the claims.

This application is entitled to and claims the benefit of Japanese Patent Application No. 2021-164921 filed on Oct. 6, 2021, the disclosure each of which including the specification, drawings and abstract is incorporated herein by reference in its entirety.

REFERENCE SIGNS LIST

1 Connector set
10 Coaxial cable
11 Inner conductor
12 Outer shield layer
21A, 21B Interconnection shielding plate
22A, 22B Intermediate shielding plate
100 Plug connector (Connector)
101 First plug contact (First contact)
101*a* Signal line contact point part
101*b* Signal line connection part
101*c* Signal line relaying part
102 Second plug contact (Second contact)
102*a* Ground contact point part
102*b* Shield connection part
102*c* Ground relaying part
102*d* First relaying base part
102*e* Second relaying base part
102*f* Shielding part
102*g* Shell connecting part
102*h* Cover connecting part
103 Plug insulator
104 Cover shell
120 Receptacle connector (Mating connector)
121 First receptacle contact
122 Second receptacle contact
123 Receptacle insulator
124 Receptacle shell

The invention claimed is:

1. An electric wire-to-board connector configured to connect a circuit board and a plurality of coaxial cables used for transmission of a high-frequency signal when joined to a mating connector mounted on the circuit board, the connector comprising:

a plurality of first contacts arranged side by side in a first direction and connected to respective inner conductors of the plurality of coaxial cables; and a second contact connected to a ground that is a reference potential, wherein the first contacts include signal line connection parts connected to the inner conductors, wherein the second contact includes a plate portion extending in the first direction and in a second direction orthogonal to the first direction, and a shielding part disposed between two of the first contacts adjacent to each other in the first direction, wherein the shielding part includes two interconnection shielding plates provided between the signal line connection parts of the two first contacts so as to extend orthogonal to the first direction, and wherein the two interconnection shielding plates are respectively connected to opposite end portions of the plate portion in the first direction, each of the opposite end portions extending along the second direction.

2. The connector according to claim 1, wherein distances from the two interconnection shielding plates to a proximate first contact of the plurality of first contacts are the same.

3. The connector according to claim 1, wherein the shielding part includes two intermediate shielding plates provided orthogonal to the first direction between signal line relaying parts of the two first contacts adjacent to each other.

4. The connector according to claim 3, wherein distances from the two intermediate shielding plates to a proximate first contact of the plurality of first contacts are the same.

5. The connector according to claim 3, wherein the second contact includes a shell connecting part connected to a mating shell of the mating connector.

6. The connector according to claim 5, wherein the shell connecting part is disposed between the interconnection shielding plate and the intermediate shielding plate.

7. The connector according to claim 6, wherein the second contact includes a shield connection part connected to an outer shield layer of the plurality of coaxial cables.

8. The connector according to claim 7, wherein the second contact includes a relaying base part connected in a T-shape to the shield connection part, and wherein the shielding part is provided vertically at both end portions of the relaying base part in a width direction.

9. The connector according to claim 8, further comprising a cover shell configured to make physical contact with the relaying base part so as to be electrically connected to the second contact.

10. The connector according to claim 9, wherein the cover shell is connected to the mating shell, and sandwiches the mating shell together with the shell connecting part.

11. A connector set comprising:

a plug connector including the connector according to claim 1; and a receptacle connector including the mating connector.

12. The connector set according to claim 11, wherein the receptacle connector includes:

a plurality of first mating contacts physically and electrically connected to the plurality of first contacts; and a mating shell physically and electrically connected to the second contact, and wherein the mating shell includes a shell shielding part provided orthogonal to an opposing direction of surface mounting parts of the first mating contacts adjacent to each other between the surface mounting parts.

13. A connector-equipped cable comprising:

the connector according to claim 1; and the coaxial cable connected to the connector.

* * * * *